(No Model.)
A. J. BEATON.
PIPE HANGER.
No. 528,319. Patented Oct. 30, 1894.
Fig. 1.
Fig. 2.
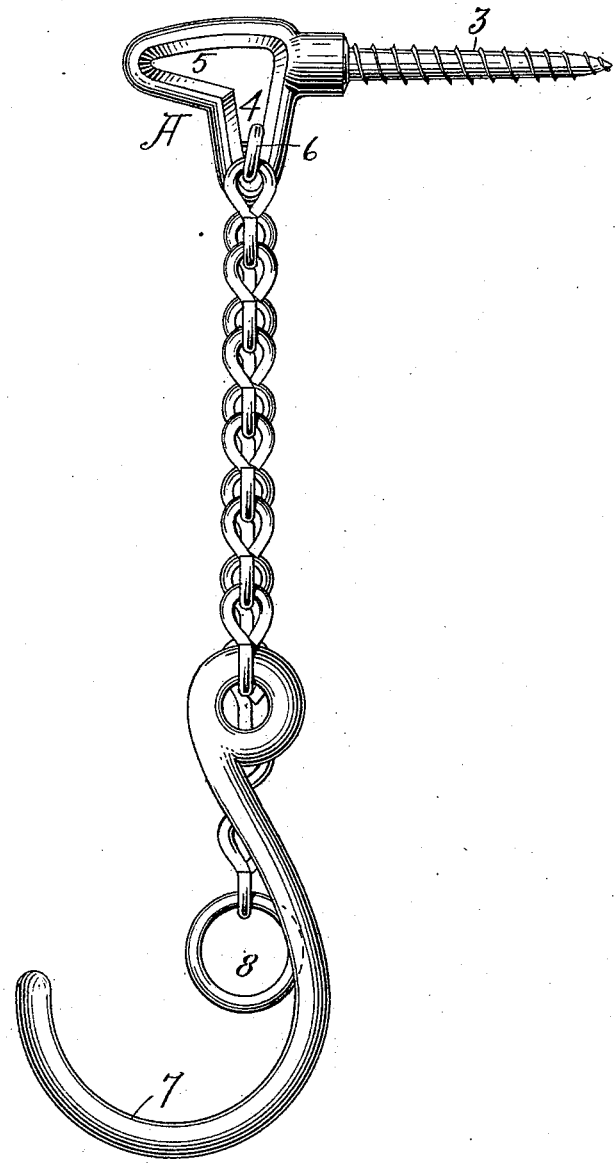
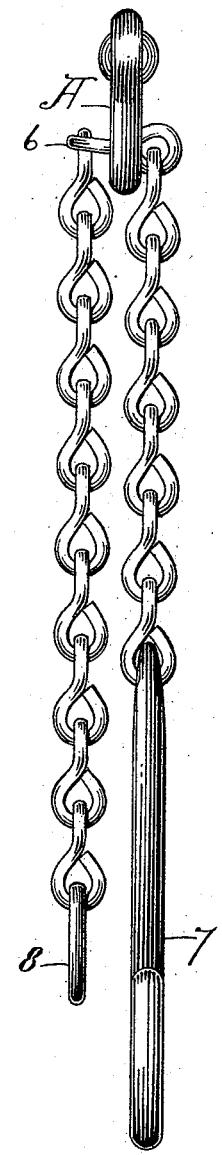
Witnesses
G. W. Stipek.
C. Darwin Loomis Jr
Inventor
Allan J. Beaton.
By James Shepard
Atty

UNITED STATES PATENT OFFICE.

ALLAN J. BEATON, OF NEW BRITAIN, CONNECTICUT.

PIPE-HANGER.

SPECIFICATION forming part of Letters Patent No. 528,319, dated October 30, 1894.

Application filed May 3, 1893. Serial No. 472,881. (No model.)

*To all whom it may concern:*

Be it known that I, ALLAN J. BEATON, a citizen of the United States, residing at New Britain, in the county of Hartford and State of Connecticut, have invented certain new and useful Improvements in Pipe-Hangers, of which the following is a specification.

My invention relates to improvements in pipe hangers, and the chief objects of my improvement are simplicity and economy in construction and general efficiency and convenience in use.

In the accompanying drawings: Figure 1 is a side elevation of my pipe hanger, and Fig. 2 is a front or edge view of the same.

A designates a supporting bracket having a shank 3 which may be either plain or screw threaded as desired and having also one or more chain holding sockets 4 and 5, the same being designed to receive the body of the chain link 6, while the ends of the chain link project therefrom and on one side stand substantially transverse to the sides in the chain holder so that the end of the link is caught by the side walls of the holder as shown.

I prefer to make the chain holding socket in the form of an inclosed eye with the opening therethrough at one part large enough to readily let the body of the chain pass through it while it is narrower at another part for holding the chain as shown.

The chain link 6 is connected with a series of like links forming a chain of any desired length to one end of which I secure the pipe hanger 7 of any ordinary form, but preferably in the form of a hook as shown while to the opposite end of the chain I secure the ring 8 which is large enough to prevent the chain from being wholly detached from the chain holding socket, the ring preventing the chain from being pulled through in one direction and the pipe hanger preventing the chain from being pulled through in the opposite direction.

I prefer to form two chain holding sockets 4 and 5 in the bracket A, one standing substantially at right angles to the shank 3, while the other one 5 is substantially in alignment therewith, the socket 4 being employed when the shank is secured in a horizontal position, as for instance, to a side wall or post and the socket 5 being for use in like manner when the shank is secured in a vertical position to an over head support.

In assembling the parts, I prefer to attach the hanger to one end of the chain, then pass the opposite end of the chain through one of the sockets and afterward secure the ring 8 to prevent accidental displacement.

The hanger may be adjusted to any desired elevation by removing the link 6 from the socket and then raising or lowering the chain and inserting one or the other links in the chain holding socket in like manner.

This device is simple and cheap in construction, it is readily adjusted vertically and it is efficient and convenient in use as it allows the greatest range of position for the pipe, while at the same time the pipe is securely hung.

The chain may be twisted or partially turned so as to bring the hanger into any desired angle with reference to the bracket.

I claim as my invention—

In a pipe hanger, the bracket A having a supporting shank and two chain holding sockets 4 and 5, one of which is designed for suspending the chain therefrom at right angles to the shank, and the other for suspending the chain in the same general direction as the shank, substantially as described and for the purpose specified,

ALLAN J. BEATON.

Witnesses:
 JAMES SHEPARD,
 A. W. STIPEK.